(12) United States Patent
Nakamura et al.

(10) Patent No.: US 6,591,248 B1
(45) Date of Patent: Jul. 8, 2003

(54) BANNER ADVERTISEMENT SELECTING METHOD

(75) Inventors: Atsuyoshi Nakamura, Tokyo (JP); Naoki Abe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/447,946

(22) Filed: Nov. 29, 1999

(30) Foreign Application Priority Data

Nov. 27, 1998 (JP) .......................................... 10-337649

(51) Int. Cl.⁷ .............................................. G06F 17/60
(52) U.S. Cl. ...................................................... 705/14
(58) Field of Search .......................................... 705/14

(56) References Cited

U.S. PATENT DOCUMENTS 5,948,061 A * 9/1999 Merriman et al. .......... 709/219

FOREIGN PATENT DOCUMENTS

| EP | 822718 | * | 2/1998 |
|----|--------|---|--------|
| JP | 6-259411 |  | 9/1994 |
| JP | 9-83678 |  | 3/1997 |
| JP | 10-200575 |  | 7/1998 |
| JP | 10-240828 |  | 9/1998 |
| JP | 10-254829 |  | 9/1998 |
| JP | 11-143875 |  | 5/1999 |

OTHER PUBLICATIONS

Salganicoff, M. et al., "Active Exploration and Learning in Real–Valued Spaces using Multi–Armed Bandit Allocation Indices, in" "Machine Learning", Proceedings of the Twelfth International Conf. on Machine Learning, Jul. 9–12, 1995, pp. 480–487.
"8.5 Simple Method", Ch. 8, Transportation Problems, Intro. to Linear Prog. Method, Japan, pp. 163–164, 1980.
"What is Akaike Information Criterion (AIC)", by Koji Akaike, Suri–Kagaku, No. 153, Mar., 1976, p. 5.
"Modeling by Shortest Data Description", by J. Rissanen, Automatica, pp. 465–471, vol. 14, 1978.
"Laplace's Recurrence Raw", by Hajime Takeuchi, Dictionary of Statistics, pp. 77–78.
"AdForce", one page from http://adforce.com on Apr. 12, 2000.
"AdKnowledge", one page from http://adknowledge.com on Apr. 12, 2000.
"DART", on page from http://doubleclick.com:880/publishers/services on Apr. 12, 2000.
"Select Cas for Ad Servers", on page from http:...aptex.com/Product/scketeaut/index.htm on Apr. 12, 2000.

* cited by examiner

*Primary Examiner*—Donald L. Champagne
(74) *Attorney, Agent, or Firm*—Foley & Lardner

(57) ABSTRACT

A banner advertisement selecting method is disclosed comprising the steps of (a) estimating the input probability of each attribute and the click rate of each advertisement for each attribute corresponding to an input attribute distribution of the banner advertisement and a click history of which the banner advertisement was clicked, (b) obtaining a display probability of each banner advertisement for each attribute so that the total click rate becomes maximum with conditions such as the desired number of display times of each banner advertisement being satisfied, (c) selecting a banner advertisement according to the display probability, and (d) transforming a restricted objective function maximizing problem obtained at step (b) to a transportation problem and solving the transportation problem.

17 Claims, 8 Drawing Sheets

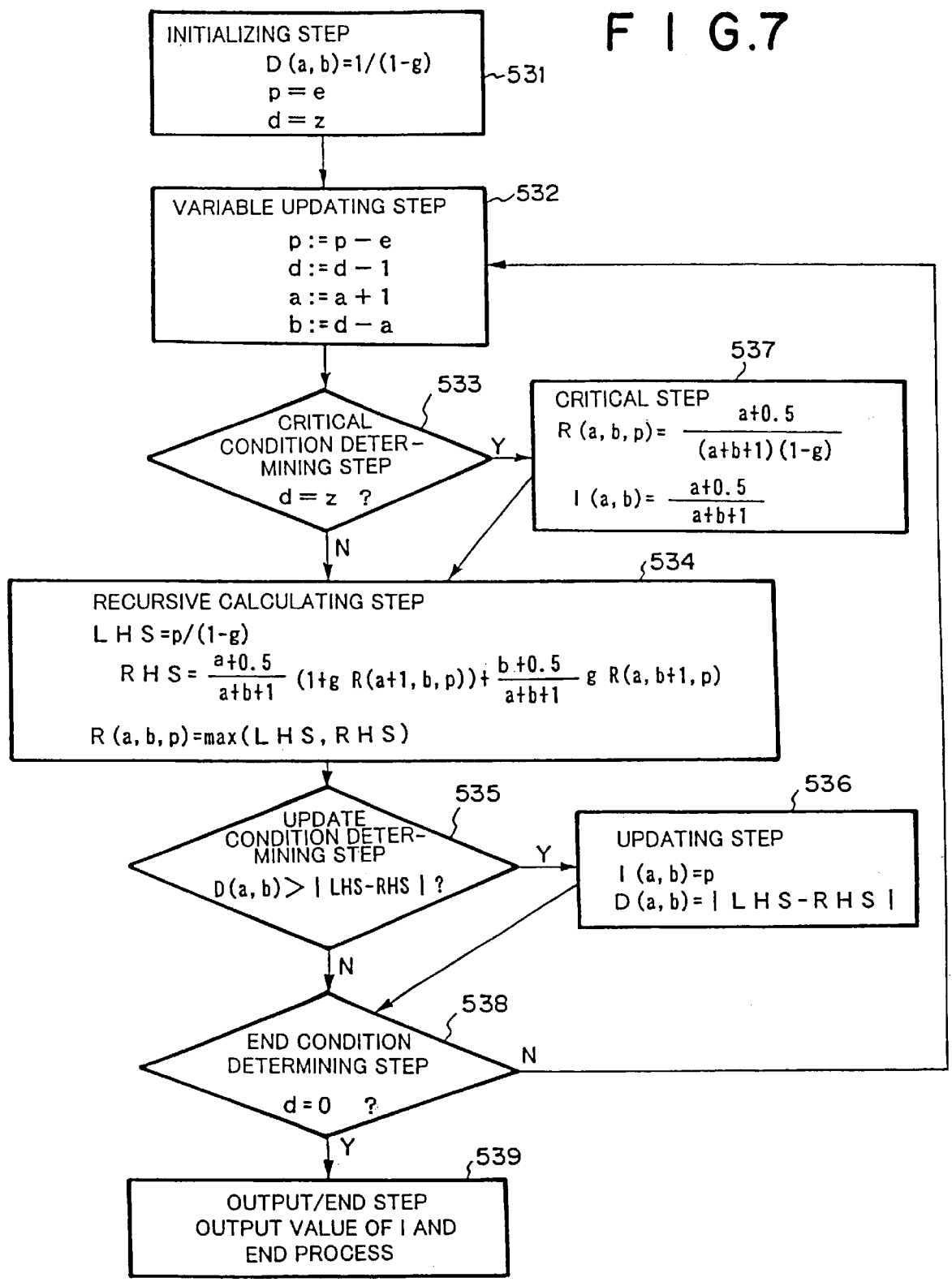

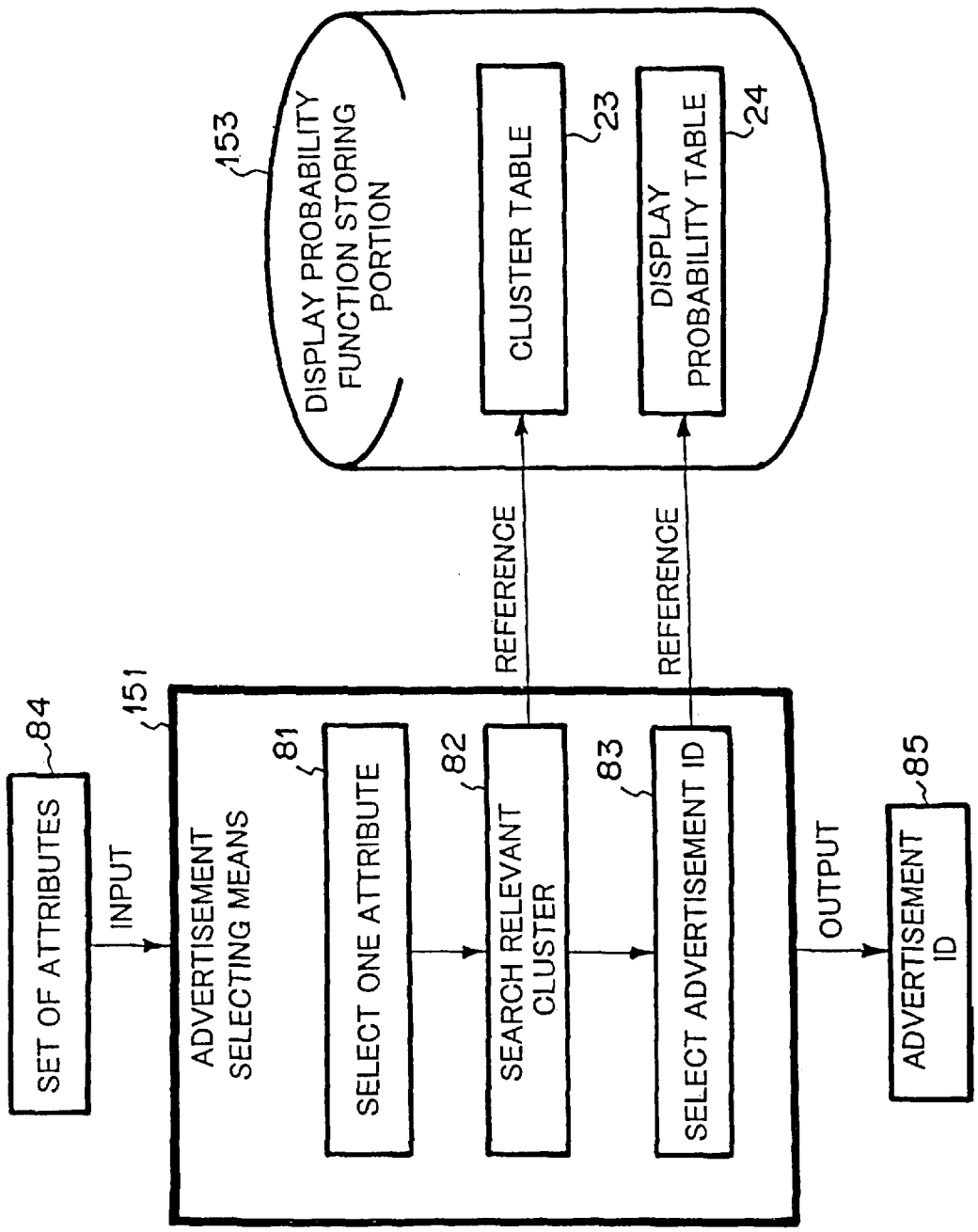

BANNER ADVERTISEMENT SELECTING METHOD

BACKGROUND OF THE INVENTION

1. Field of the Invention

The present invention relates to an information filtering technology, in particular, to a banner advertisement selecting method for selecting a banner advertisement suitably displayed on each web page of the world wide web (WWW) of the Internet.

2. Description of the Related Art

The WWW is a collection of linked documents stored in information transmitting systems and their server systems on the Internet exchanged using the Hypertext Transfer Protocol (HTTP). The WWW may be simply referred to as web. These documents include text, images, video, and sound that are referred to as multi media or hyper text. In the WWW, these documents described in the Hyper Text Markup Language (HTML) are stored in the servers at web sites on the Internet. To browse documents of web sites in the world, special software termed web browser is used.

A banner advertisement displayed on a web page is selected corresponding to information that is transmitted in association with a home page browsing request or a keyword searching request (for example, the search keyword, the user domain name, the user ID, and the date), information of a browsed page (for example, the contents of the page, keywords, and categories), and user information (for example, past browsed pages and favorite fields).

To narrow banner advertisements using such information, several methods have been used. As one method, a rule is directly designated. As another method, the favorites of the user are learnt corresponding to his or her past click history. Corresponding to the learnt result, a user's favorite banner advertisement is predicted and selected. These methods are known as "AdForce" (AdForce Company), "AdKnowledge" (AdKnowledge Company), "DART" (Double Click Company), "Select Cast for Ad Servers (Aptex Company), and so forth.

In addition, there are many methods for clustering words and attributes. For example, a method for clustering words using minimum description length method has been disclosed by Ri and Abe as Japanese Patent Application No. 09-306966 "Automatic Word Classifying Apparatus and Automatic Word Classifying Method". However, so far, a method for clustering search keywords and page attributes corresponding to the past click history and effectively selecting advertisements has not been disclosed.

Gittins Index is known as a ramification of the theorem of Bayes. According to Gittins Index, when a banner advertisement is selected, if there are a plurality of alternatives with unknown success probabilities, an optimum alternative is obtained corresponding to the number of successes and the number of fails in past attempts. For details of Gittins Index, refer to "Multi-armed bandit allocation indices" by J. C. Gittins, John Wiley and Sons, 1988. However, the concept of Gittins Index has not been effectively used for selecting a banner advertisement in such a manner that the click rate becomes maximum in various constraints.

As described above, in the related art references, banner advertisements suitable for individual pages and users can be displayed. However, they do not have functions for detecting the number of display times of banner advertisements and the number of click times thereof and for effectively selecting a banner advertisement on balance.

In addition, to select a banner advertisement, the related art references do not have functions for clustering attribute values with a similar click history and reducing the number of learning parameters corresponding to search keywords and attributes of a browsing page. Thus, the learning speed is not high.

Moreover, the related art references do not optimally solve the tradeoff of the selection of various advertisements for improving the estimation accuracy of the click rate and the selection of advertisements with high click rate.

SUMMARY OF THE INVENTION

An object of the present invention is to provide a banner advertisement selecting method that allows restrictions such as a contracted number of display times and a contracted number of click times to be satisfied with data of the number of display times of a banner advertisement and the number of click times thereof and a banner advertisement to be selected in such a manner that the total click rate becomes high. In addition, an object of the present invention is to provide a method that allows the above-described problems to be solved and a high click rate to be accomplished with small amount of data.

The present invention is a banner advertisement selecting method for selecting a banner advertisement displayed on a page browsed through the world wide web (WWW) from an attribute list obtained corresponding to information transmitted with a page browsing request, information of the browsed page, and user information, the method comprising the steps of (a) estimating the input probability of each attribute and the click rate of each advertisement for each attribute corresponding to an input attribute distribution of the banner advertisement and a click history of which the banner advertisement was clicked, (b) obtaining a display probability of each banner advertisement for each attribute so that the total click rate becomes maximum with conditions such as the desired number of display times of each banner advertisement being satisfied, (c) selecting a banner advertisement according to the display probability, and (d) transforming a constrained objective function maximizing problem obtained at step (b) to a transportation problem and solving the transportation problem.

The banner advertisement selecting method further comprises the steps of (e) clustering attributes with similar click histories, step (e) being followed by step (b), (f) obtaining a cluster to which the input attribute belongs, and (g) selecting a banner advertisement to be displayed according to the display probability of each banner advertisement for the cluster.

Step (b) is performed by treating step (e) as a problem for estimating a click rate conditioned with each attribute using a past click rate history for each attribute, and repeatedly combining attributes that causes the total description length to be minimized or sub-minimized using a greedy heuristic based on the theory of minimum description length so as to decrease the number of estimation parameters and improve the estimation accuracy.

Step (b) is performed by treating step (e) as a problem for estimating a click rate conditioned with each attribute using a past click rate history for each attribute, and repeatedly combining attributes that causes the total information amount to be minimized or sub-minimized using a greedy heuristic based on Akaike information criterion so as to decrease the number of estimation parameters and improve the estimation accuracy.

The banner advertisement selecting method further comprises the step of securing a large value as the minimum display probability that is inversely proportional to the square root of the number of display times of each banner advertisement with each attribute.

The banner advertisement selecting method further comprises the steps of calculating estimation value c of the click rate for each banner advertisement j with each attribute i using the number of display times and the number of click times, obtaining estimation value $\mu$ of the click rate for attribute i of past banner advertisement j' having attributes similar to the attribute of banner advertisement j, adding 1 to the number of display times of banner advertisement j with attribute i, and calculating estimation value c of the click rate with a value of which $\mu$ is added to the number of click times.

In the banner advertisement selecting method, Gittins Index or compensated Gittins Index compensated by Laplace estimation is used instead of the estimation value of the click rate that forms the maximized objective function.

The banner advertisement selecting method further comprises the step of randomly selecting one attribute from a plurality of input attributes, and selecting a banner advertisement to be displayed according to the display probability of each banner advertisement with the selected attribute.

Step (c) is performed by clustering attributes with similar click history, securing the minimum display probability inversely proportional to the square root of the number of display times of an advertisement against an attribute, adding a click rate estimated from a past advertisement that is similar to the relevant advertisement to the number of click times, estimating the resultant value with Gittins Index, transforming a constrained objective function optimizing problem to a transportation problem, and applying the solution of the transportation problem to calculate an optimal display probability of each banner advertisement for each attribute.

Step (c) is performed by selecting one from a plurality of input attributes at random, obtaining a cluster to which the selected attribute belongs, and selecting a banner advertisement according to the display probability of each advertisement against the obtained cluster.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 7 is a detailed flow chart a calculating means according to the embodiment of the present invention; and FIG. 8 is a flow chart showing an advertisement selecting means according to the embodiment of the present invention.

DESCRIPTION OF PREFERRED EMBODIMENTS

Next, with reference to the accompanying drawings, an embodiment of the present invention will be described.

Figure 1:
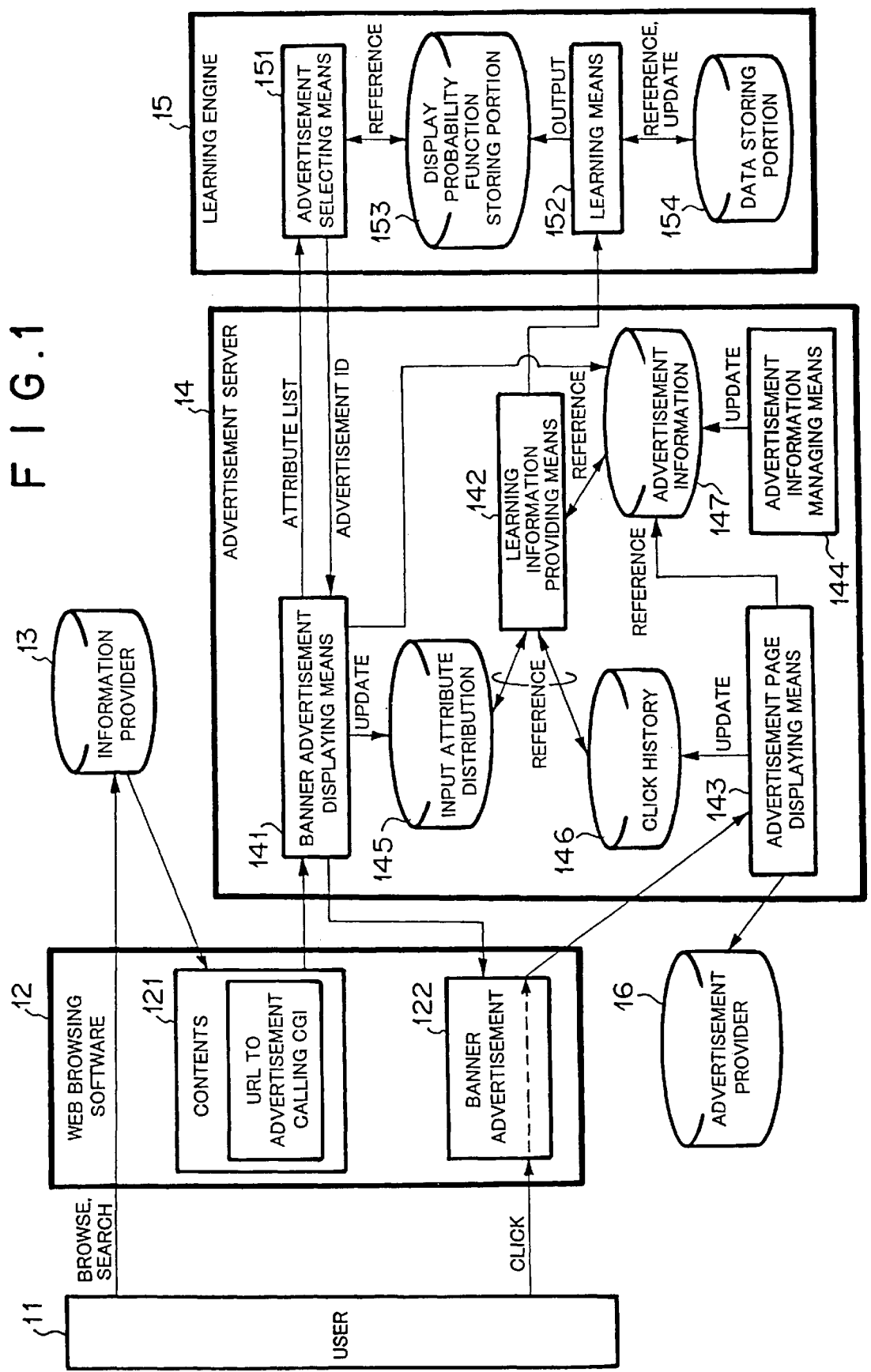
FIG. 1 is a block diagram showing the structure of an embodiment of the present invention.

In FIG. 1, reference numeral 11 is a user linked to the Internet network as the world wide web (WWW). The user browses home pages and searches documents using keywords on the Internet. An information provider 13 provides the user with a home page and a keyword search service. The information provider 13 places banner advertisements on its home page and keyword search page so as to gain profits. Since the advertisement placement management is complicated, it is performed by an advertisement server 14 of the information provider 13 or an advertisement management company. When the user clicks a banner advertisement, he or she can access detailed advertisement information of an advertisement provider 16. Thus, for the advertisement provider 16, the advertisement efficiency is proportional to the number of click times of a banner advertisement.

In FIG. 1, reference numeral 12 is web browsing software. With the web browsing software 12, multi-media (hypertext) documents such as text, image, and sound can be displayed page by page. When the web browsing software 12 transmits a home page browsing request or a keyword searching request to the information provider 13, it sends back the requested contents to the web browsing software 12. When the contents have a page on which a banner advertisement has been placed, the page contains a URL (Uniform Resource Locator) of an advertisement calling CGI (Common Gateway Interface) program stored in the advertisement server 14.

Thus, the web browsing software 12 requests the advertisement server 14 to select a banner advertisement and to transmit image data thereof to the web browsing software 12. The URL is a format of which the location of particular data is described using an access path thereto. Normally, the URL is described in the order of a protocol, a server name, and a file name (for example, http://www.aabbcc.co.jp/index.html). When the user clicks a banner advertisement received from the advertisement server 14, it records a click history and displays the home page containing various advertisement information of the advertisement provider 16.

The information provider 13 provides contents 121 on the Internet. The information provider 13 also contracts the advertisement provider 16 to place its banner advertisements on pages of the contents 121. However, when the advertisement provider 16 contracts the information provider 13 to place a plurality of banner advertisements on a plurality of pages, the banner advertisements are not directly placed on the pages. Instead, the URL of the CGI program that causes the advertisement server to select advertisements and transmit image data thereof is placed in the contents 121. The resultant contents 121 are transmitted to the web browsing software 12. Thus, the advertisement placing process can be flexibly performed.

The advertisement server 14 of the information provider 13 or the advertisement management company has a banner advertisement displaying means 141, an advertisement page displaying means 143, a learning information providing means 142, and an advertisement managing means 144. The banner advertisement displaying means 141 selects a banner advertisement and transmits image data thereof to the web browsing software 12. The advertisement page displaying means 143 records a click history and displays detailed advertisement pages of the advertisement provider 16. The learning information providing means 142 provides a learning engine 15 with an input attribute distribution 145, a click history 146, and advertisement information 147 so that the learning engine learns a display probability function used to select an advertisement. The advertisement managing means 144 manages advertisement contract information and so forth.

The learning engine 15 has an advertisement selecting means 151, a display probability function storing portion 153, a learning means 152, and a data storing portion 154. The learning means 152 stores a predictive display probability function referenced by the advertisement selecting means 151 to the display probability function storing portion 153. The data storing portion 154 is referenced and updated by the learning means 152.

With reference to FIG. 1, the advertisement selecting means 151 inputs an attribute list from the banner advertisement displaying means 141, selects a proper advertisement ID using the predictive display probability function stored in the display probability function storing portion 153, and outputs the selected advertisement ID to the banner advertisement displaying means 141. The learning means 152 inputs the input attribute distribution 145, the click history 146, and the advertisement information 147, references and updates the click history database and the advertisement attribute database stored in the data storing portion 154, and updates the display probability function stored in the display probability function storing portion 153.

Next, with reference to FIGS. 2 to 8, the operation of the embodiment of the present invention will be described.

Figure 2:
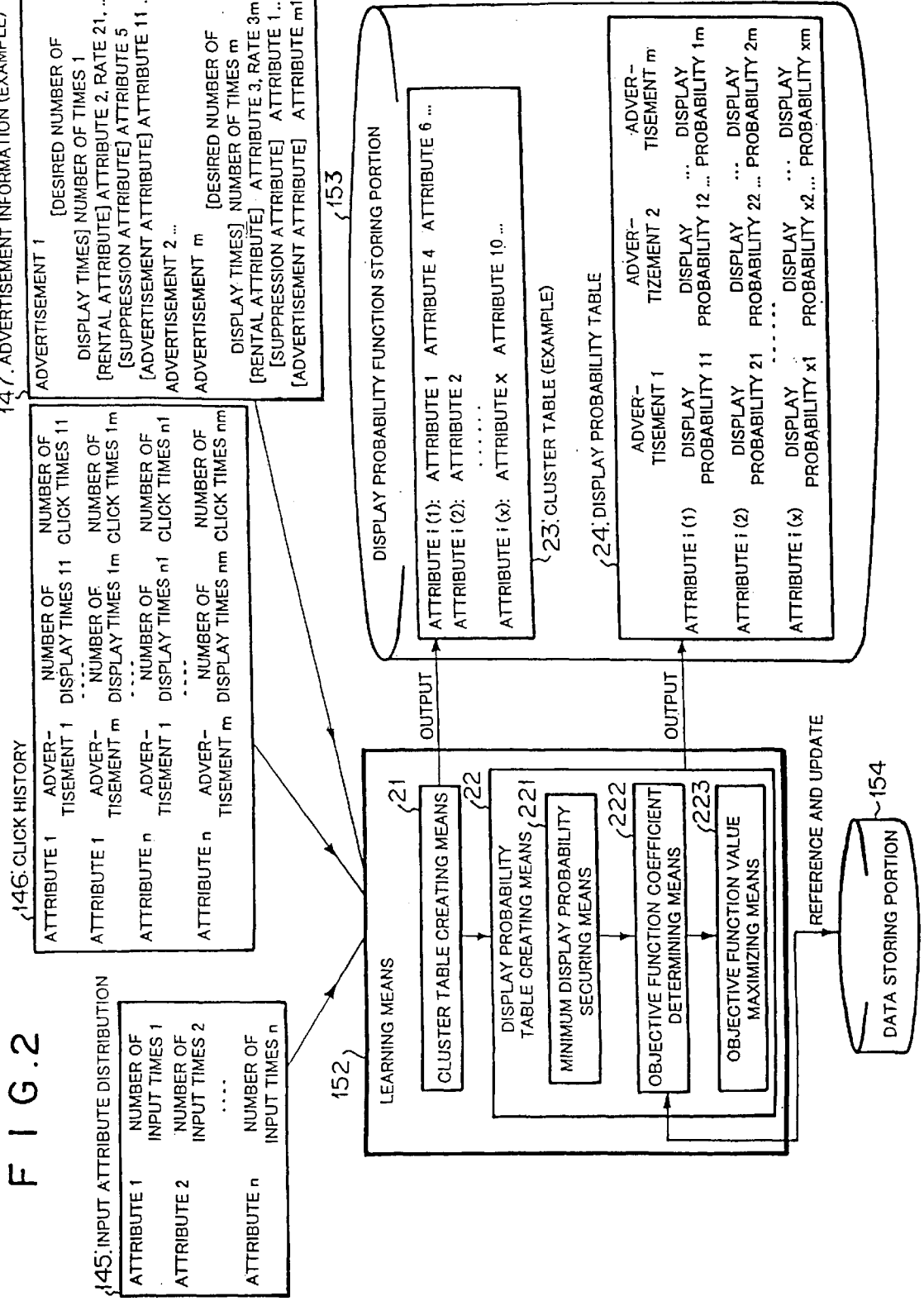
FIG. 2 is a flow chart showing a learning means according to the embodiment of the present invention.

FIG. 2 is a flow chart showing a process of the learning means 152 according to the embodiment of the present invention. The learning means 152 receives the input attribute distribution 145, the click history 146, and the advertisement information 147 from the learning information providing means 142 of the advertisement server 14. The input attribute distribution 145 is occurrence frequency information of attributes of advertisement placed pages that were browsed and searched. Attributes and numbers of input times thereof are paired (attribute 1 and the number of input times 1 are paired; attribute 2 and the number of input times 2 are paired; . . . , attribute n and the number of input times n are paired) and input to the learning means 152.

The click history 146 is information of the number of display times and the number of click times of each attribute and each advertisement. The click history 146 is input to the learning means 152. The advertisement information 147 is information of advertisements to be scheduled. The advertisement information 147 has the number of desired impressions (display times), rental attributes (that designates a display percentage of an advertisement on pages having that attribute) and their rental rates, suppression attributes (that suppresses an advertisement from being displayed on pages having that attribute), and advertisement attributes (keywords that represents an advertisement). The advertisement information 147 is input to the learning means 152.

The learning means 152 has a cluster table creating means 21 and a display probability table creating means 22. The cluster table creating means 21 clusters attributes based on the input attribute distribution. The resultant data is output as a cluster table 23 to the display probability function storing portion 153. For example, as attribute i(1), attributes 1, 4, 6, . . . are recorded as the same class.

The display probability table creating means 22 has a minimum display probability securing means 221, an objective function coefficient determining means 222, and an objective function maximizing means 223. The display probability table creating means 22 outputs the display probability table 24 to the display probability function storing portion 153. The display probability table 24 is a table of display probabilities d (x,j) of individual advertisements j against individual attributes i (x) that have been clustered. For example, the display probability table 24 shows the correlations of attributes i(x), advertisements j, and display probabilities xj (for example, display probability d (1, 1) of advertisement 1 against attribute i (1) is display probability 11; display probability d (1, 2) of advertisement 2 against attribute i (1) is display probability 12, and so forth.

Now, the input rate of each attribute i (x) against all attributes that have been clustered is denoted by k (x). The input rate k (x) is obtained with the input attribute distribution 145 and the cluster table 23. k (x)·d (x,j) represents the rate of which a page with attribute i (x) is browsed or searched and advertisement j is displayed. Coefficient c (x,j) is considered for each attribute i (x) and each advertisement j. An objective function is defined as the sum of c (x,j)·k (x)·d (x,j) for all attributes i (x) and for all advertisements j. The display probability table creating means 22 obtains display probabilities d (x,j) so that the objective function becomes maximum in the range of which restriction expressions with respect to d (x,j) is satisfied.

On the other hand, the minimum display probability securing means 221 obtains the restriction expression with respect to the display probabilities d (x,j) using the rental attribute, the suppression attribute, and the number of display times up to the present time contained in the advertisement information 147.

$$d(x, j) \geq B(x, j)(x=1, 2, \ldots, s; j=1, \ldots, m) \tag{1}$$

where s is the number of attributes that have been clustered; and m is the number of all advertisements.

Next, the objective function coefficient determining means 222 determines coefficients c (x,j) of the objective function. In addition to the restriction expression of formula (1), the objective function maximizing means 223 considers restriction expressions of formulas (2) and (3). Formula (2) is necessary in order to make real display rate of advertisement j close to desired display rate h(j) which is calculated with the number of desired display times contained in the advertisement information 147. The restriction expression of formula (2) is given by:

$$\sum_{x=1}^{s} k(x)d(x, j) = h(j) \quad (j = 1, \cdots, m) \tag{2}$$

The restriction expression of formula (3) represents that the sum of display probabilities d (x,j) for all advertisements j against each attribute i (x) becomes 1. The restriction expression of formula (3) is given by:

$$\sum_{j=1}^{m} d(x, j) = 1 \quad (x = 1, \cdots, s) \tag{3}$$

The present invention solves a linear programming problem that satisfies the restriction expressions of formulas (1), (2), and (3) and that maximizes the value of the following objective function of formula (4).

$$\sum_{x=1}^{s}\sum_{j=1}^{m}c(x,j)k(x)d(x,j) \qquad (4)$$

By replacing k (x)·d (x,j) with p(x,j), this linear programming problem can be transformed into a special linear programming problem (referred to as Hitchcock's transportation problem) that satisfies formulas (5), (6), and (7) and that maximizes the value of formula (8).

$$\sum_{x=1}^{s}p(x,j) = h(j) \qquad (j=1,\cdots,m) \qquad (5)$$

$$\sum_{j=1}^{m}p(x,j) = k(x) \qquad (x=1,\cdots,s) \qquad (6)$$

$$p(x,j) \geq k(x)B(x,j) \quad (x=1,\cdots,s;\, j=1,\cdots,m) \qquad (7)$$

$$\sum_{x=1}^{s}\sum_{j=1}^{m}c(x,j)p(x,j) \qquad (8)$$

According to the present invention, a special solution using simplex method is applied for solving a Hitchcock's transportation problem (for details, refer to "8.5 Simplex Method, Chapter 8 Transportation Problems, Introduction to Linear Programming Method (translated title)", Sangyo Tosho Publishing Company, Japan, pp. 163–164, 1980). A transportation (planning) problem is one of optimized design planning methods, for example, a transportation planning method for transporting products (for example, beer) produced (brewed) by several factories to retailers at the cheapest cost. In this example, the production amount of one type of products produced by each factory, the sales amount of each retailer, and the transportation costs from individual factories to individual retailers are given. With these data, the transportation amounts from individual factories to individual retailers are obtained so that the total transportation cost becomes minimum. In the banner advertisement selecting problem, the input rate k (x) of attribute cluster x corresponds to the sales amount of retailer x. The desired display rate h (j) of advertisement j corresponds to the amount of production at factory j. The coefficient c (x,j) corresponds to the transportation cost from factory j to retailer x. The display probability d(x,j) corresponds to the transportation amount from factory j to retailer x. In the banner advertisement selecting problem, the display probability d (x,j) is designated so that the total number of click-throughs corresponding to the total transportation cost becomes maximum.

Next, with reference to FIG. 3, a process of the cluster table creating means 21 will be described in detail.

Figure 3:
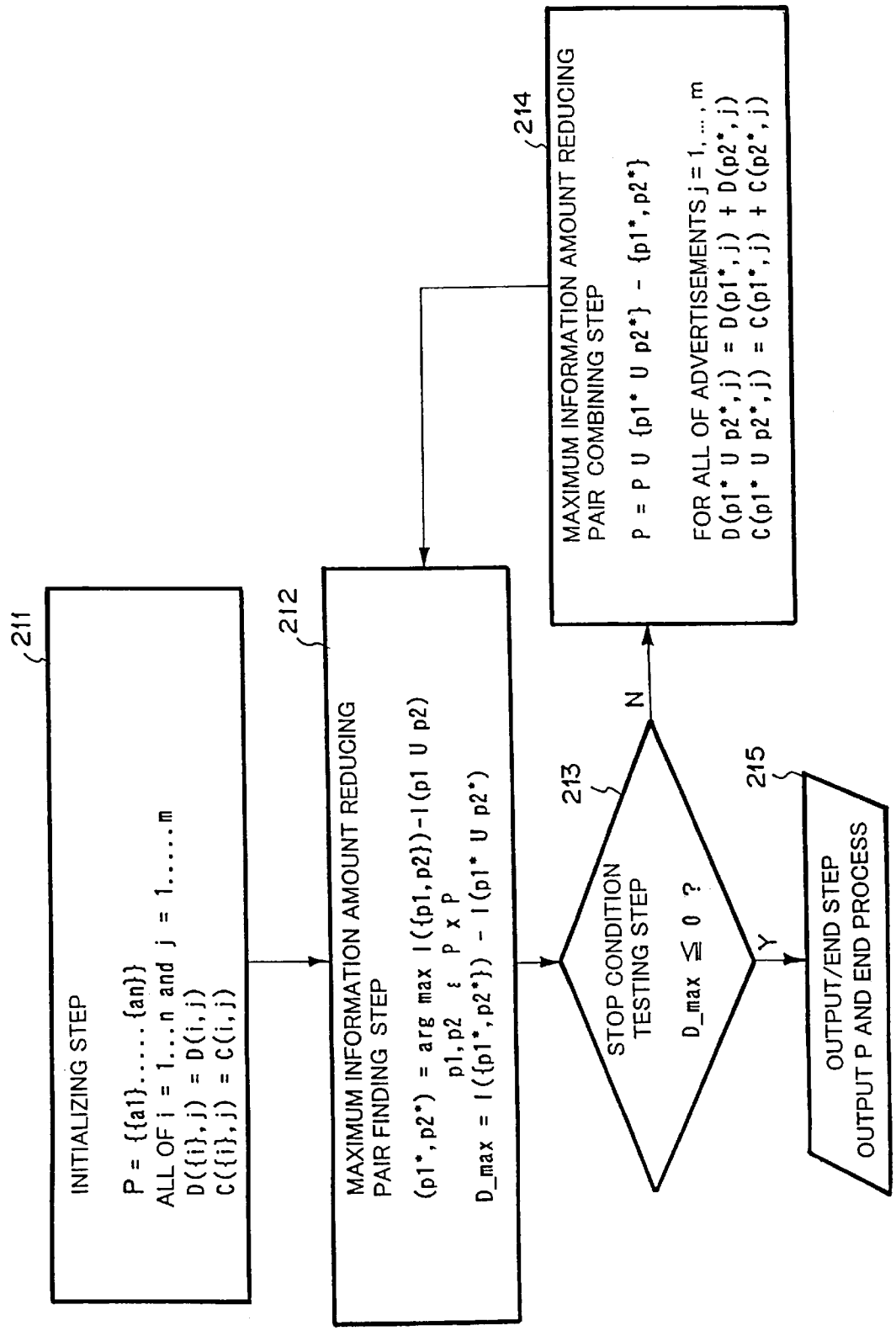
FIG. 3 is a flow chart showing a cluster table updating means according to the embodiment of the present invention.

In FIG. 3, P is partitions of a set of attributes [P={C1, C2, . . . , Cs}]. A model of a conditional probability distribution of which against an input attribute of cluster Ci of P, banner advertisement j is clicked with probability $c_P$ (i, j) is considered. At this point, the display frequency of banner advertisement j is denoted by $D_P$ (i, j); and the click frequency of banner advertisement j is denoted by $C_P$ (i, j). In this case, the estimated maximum likelihood amount of $c_P$ (i, j) is represented by $C_P$ (i, j)/$D_P$ (i, j). In this case, since $D_P$ (i, j) and $C_P$ (i, j) depend on partitions P, superscript P is used. However, in the following description, for simplicity, partitions P are omitted.

The clustering method according to the present invention depends on an information criterion. In this example, the partitions P are evaluated with the sum of two values: I(P)=DD (P)+MD (P). The minimum partition is treated as the best partition.

In the above equation, DD (P) represents the maximum logarithmic likelihood of the model (also referred to as data description length of model). The maximum logarithmic likelihood is defined by the following expression (a).

$$DD(P) = \qquad (a)$$
$$\sum_{i=1}^{s}\sum_{j=1}^{m} -\left(C(i,j)\log\frac{C(i,j)}{D(i,j)} + (D(i,j)-C(i,j))\log D(i,j) - \frac{C(i,j)}{D(i,j)}\right)$$

On the other hand, the other part MD (P) represents the complexity of the model. The complexity of the model depends on the information criterion used. In this example, Akaike Information Criterion (AIC) or Minium Description Length (MDL) is used. For details of Akaike Information Criterion, refer to "What is Akaike Information Criterion (AIC) (translated title)" by Koji Akaike, Suri-Kagaku, No. 153, March 1976. For details of Minimum Description Length, refer to "Modeling by shortest data description" by J. Rissanen, Automatica, pp. 465–471, Vol. 14, 1978.

When Akaike Information Criterion is used, the complexity of the model is measured by the number of free parameters, and MD (P) is givn by the following formula (b).

$$MD_{AIC}(P) = \sum_{i=1}^{s}\sum_{j=1}^{m}1 \qquad (b)$$

On the other hand, when Minimum Description Length (MDL) is used, the complexity of the model is measured by a model description length, and MD(P) is given by the following formula (c).

$$MD_{MDL}(P) = \sum_{i=1}^{s}\sum_{j=1}^{m}\frac{1}{2}\log D(i,j) \qquad (c)$$

$MD_{MDL}$ (P) represents the total description length when each parameter c (i, j) is given by:

$$\log\sqrt{D(i,j)}$$

Since the variance of the estimation value is O (1/D $\sqrt{(i,j)}$)intuitively, the further description is not required because of a presence of an error. When Akaike Information Criterion is used, I (P) is referred to as information amount. When Minimum Description Length is used, I (P) is referred to as description length.

When partitions P of which I (P) is minimum is obtained, if I(P) is calculated for all partitions P, the calculation amount becomes huge. Thus, according to the present invention, maximum information amount reducing pair method with greedy heuristics is used so as to reduce the calculation amount. In other words, in the method according to the present invention, a model of which each attribute is separately placed in individual clusters is considered initially, and the following procedure is repeated: two clusters are combined so that the information amount is maximally reduced.

FIG. 3 is a flow chart showing the maximum information amount reducing pair method. The cluster table creating means 21 has an initializing means (at step 211), a maximum information amount reducing pair finding means (at step 212), a stop condition testing means (at step 213), a maximum information amount reducing pair combining means (at step 214), and an output/end means (at step 215).

The initializing means 211 initializes partition P as a set of clusters composed of a single attribute. D ({i}, j) and C ({i}, j) are initialized as D (i, j) and C (i, j) for all attributes i and for all advertisements j.

The maximum information amount reducing pair finding means calculates the reduced amount of the information amount in the case that each pair of p1 and p2 of all attribute clusters are combined and stores a pair of which the reduced amount of the information amount becomes maximum as p1* and p2* (at step 212).

The stop condition testing means determines whether or not the reduced amount of the information amount of the maximum information reducing pair found by the maximum information amount reducing pair finding means 212 is 0 or less (at step 213). When the determined result at step 213 is Yes (namely, the reduced amount of the information amount is 0 or less), the flow advances to step 215, and the output/end means outputs the value of the partition P at the point (at step 215). Otherwise, the flow advances to step 214. The maximum information amount reducing pair combining means replaces two cluster p1* and p2* in P with a new cluster p1* U p2* and updates the click history and the display history of the combined cluster p1* U p2* as the sum of the click histories and the display histories of the clusters p1* and p2* (at step 214). Thereafter, the flow returns to step 212.

Alternatively, the maximum information amount reducing pair finding means may calculate the reduced amount of the information amount in the case that a plurality of pairs p1 and p2 that are selected at random, find a pair that causes the reduced amount of the information amount to become maximum, and store the found pair as p1* and p2* (at step 212). In this case, the calculating efficiency can be improved.

Next, with reference to FIGS. 4 to 7, a process of the display probability table creating means 21 will be described in detail.

Figure 4:
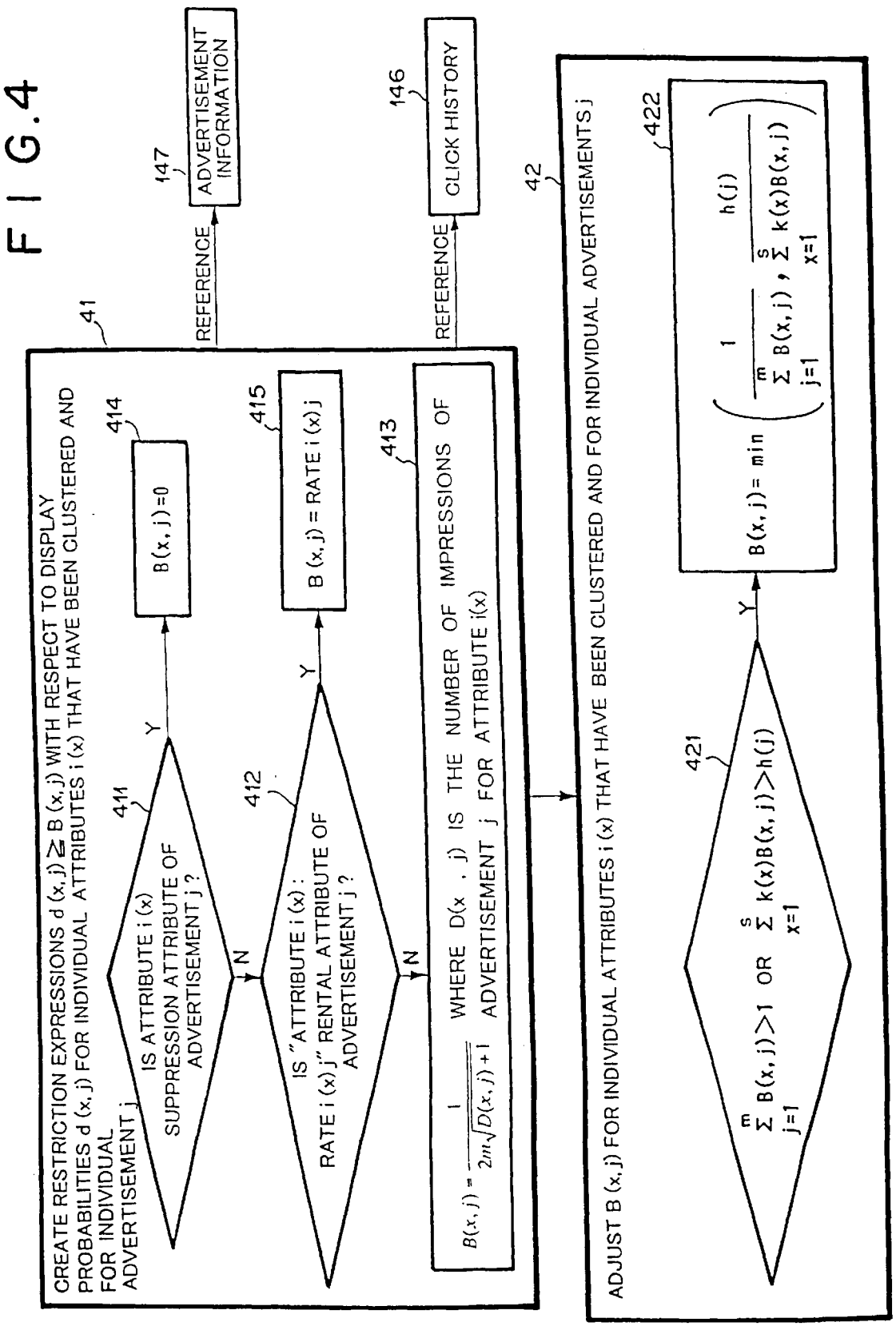
FIG. 4 is a flow chart showing a minimum display probability securing means according to the embodiment of the present invention.

FIG. 4 is a flow chart showing a process of the minimum display probability securing means (at step 221) of the display probability table creating means 21. The process of the minimum display probability securing means (at step 221) has a restriction expression generating step (at step 41) and an adjusting means (at step 42). At step 41, B (x,j) is designated so as to create restriction expressions d (x,j)≧B (x,j) for individual attributes i (x) that have been clustered and for individual advertisements j.

When attribute i (x) is a suppression attribute of advertisement j (at step 411), the following formula is satisfied.

$$B(x, j) = 0 \qquad (9)$$

When attribute i (x) is a rental attribute of rate r (i (x), j) of advertisement j (at step 412), B (x,j) is obtained by the following formula.

$$B(x, j) = r(i(x),j) \qquad (10)$$

When attribute i (x) is neither a suppression attribute of advertisement j nor a rental attribute thereof (at step 413), B (x,j) is given by the following formula so that the display probability is raised in the case that the number of display times D (x,j) is small.

$$B(x, j) = \frac{1}{2m\sqrt{D(x, j) + 1}} \qquad (11)$$

At step 42, it is determined whether or not the total of the secured portion corresponding to the restriction expression created at step 41 is too large. When the total is too large, it is adjusted. At step 421, it is determined whether or not the total of the display probability securing portion B (x,j) against all advertisements j for each attribute i (x) exceeds 1. In addition, it is determined whether or not the total of display probabilities k (x)·B (x,j) of all attributes i (x) for each advertisement j exceeds designated display rate h (j). When the determined result is Yes (namely, the total exceeds the desired display rate h (j)), the flow advances to step 422. At step 422, the total is adjusted corresponding to the following formula.

$$B(x, j) = \min\left(\frac{1}{\sum_{j=1}^{m} B(x, j)}, \frac{h(j)}{\sum_{x=1}^{s} k(x)B(x, j)}\right) \qquad (12a)$$

Next, with reference to FIGS. 5 to 7, a process of the objective function coefficient determining means 222 will be described in detail.

Figure 5:
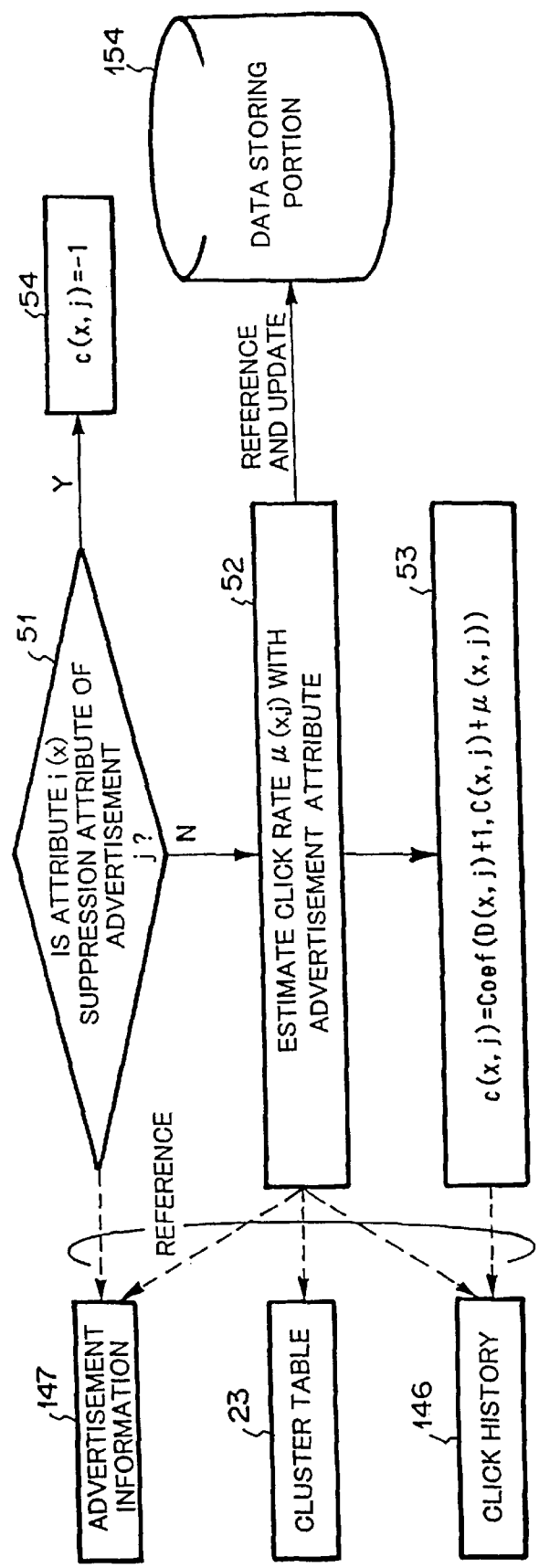
FIG. 5 is a flow chart showing an objective function coefficient determining means according to the embodiment of the present invention.

FIG. 5 is a flow chart showing the process of the objective function coefficient determining means (at step 222). The objective function coefficient determining means determines coefficients c (x,j) of the maximized objective function for individual clustered attributes i (x) and for individual advertisements j (at step 222). The objective function coefficient determining means determines whether or not attribute i (x) is an suppression attribute of advertisement j with advertisement information 147 (at step 51). When the determined result at step 51 is Yes (namely, attribute i (x) is a suppression attribute of adjustment j), the flow advances to step 54. At step 54, the objective function coefficient determining means sets −1 to c (x,j). When the determined result at step 51 is No (namely, attribute i (x) is not a suppression attribute of adjustment j), the objective function coefficient determining means searches the most similar advertisement from advertisements stored in the data storing portion 154 using the advertisement attributes contained in the advertisement information 147 and estimates click rate $\mu$ (x,j) of advertisement j based on the click history of the found advertisement(at step 52).

When there is no information of similarity of advertisements or it is not used, the objective function coefficient determining means may set ½ to $\mu$ (x,j). In the case that attribute i(x) is not a suppression attribute, the objective function coefficient determining means obtains coefficient c (x,j) using an estimation function Coef which estimates a click rate from the number of impressions D(x,j) and the number of click-throughs C(x,j) (at step 53). D (x,j) and C(x,j) for advertisement j and attribute i (x) are found in click history 146. In present invention, D(x,j)+1 and C(x, j)+$\mu$ (x,j), instead of D(x,j) and C(x,j), are used as the number of impressions and the number of click-throughs input to function Coef. As the estimation function Coef at step 53, one of various click rate estimating methods can be used. Normally, the estimation function Coef is given by the following formula.

$$\mathrm{Coef}(D(x,\,j)+1,\,C(x,\,j)+\mu(x,\,j))=\frac{C(x,\,j)+\mu(x,\,j)}{D(x,\,j)+1} \quad (12b)$$

As a estimation function Coef, Gittins Index or "compensated Gittins Index" which is Gittins Index compensated by Laplace estimation may be used. As will be described later (see FIG. 7), in the banner advertisement selecting method according to the present invention, Gittins Index or the "compensated Gittins Index" is used. For details of Laplace estimation amount, refer to "Laplace's recurrence raw" by Hajime Takeuchi, Dictionary of Statistics, Toyo-Keizai Shinpo-Sha, pp. 77–78. For details of Gittins Index, refer to "Multi-armed bandit allocation indices" by J. C. Gittins, Jon Wiley and Sons, 1988. It should be noted that "compensated Gittins Index" is a concept introduced in the present invention.

Figure 6:
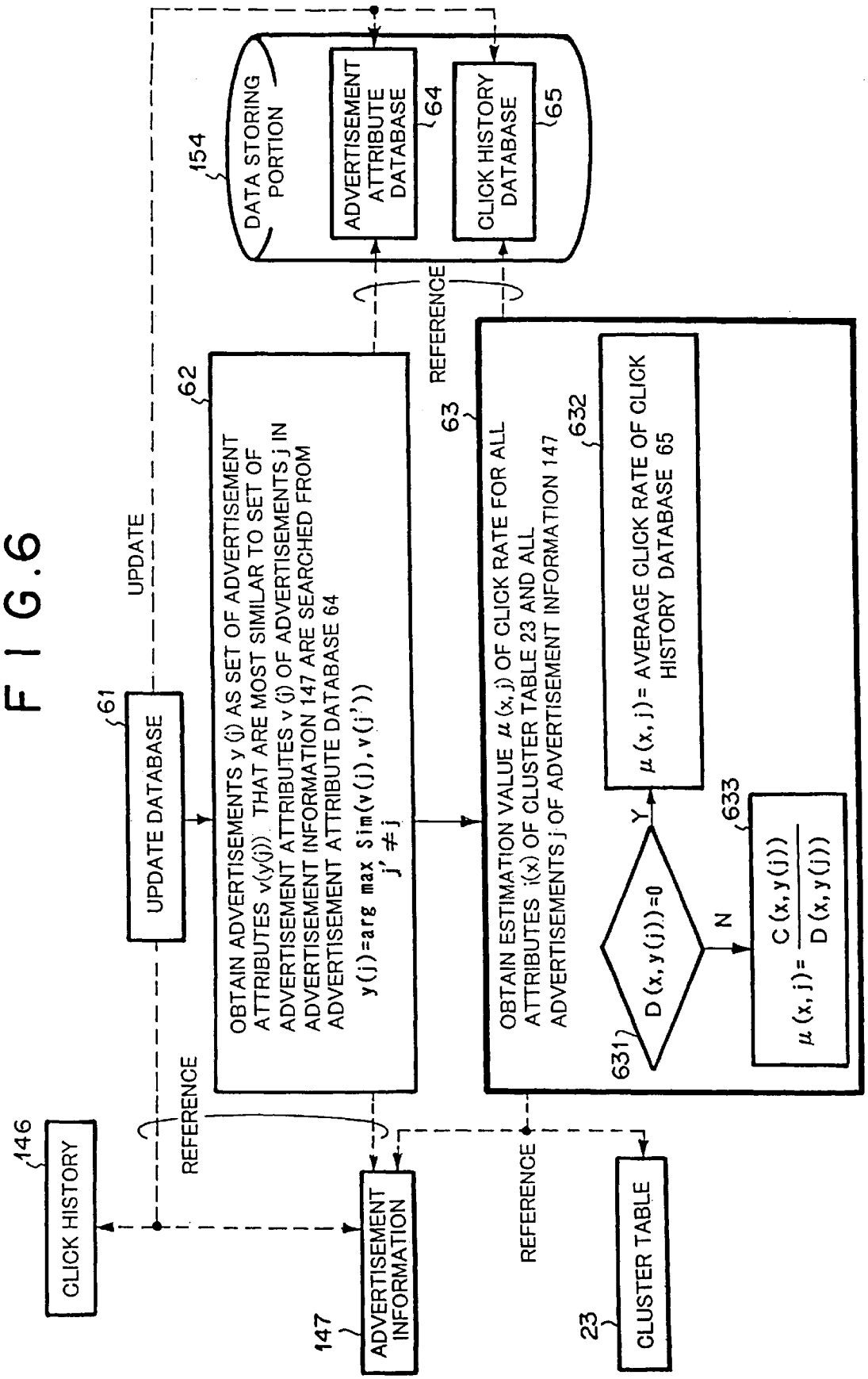
FIG. 6 is a detailed flow chart showing a click rate estimating step according to the embodiment of the present invention.

FIG. 6 is a flow chart showing an estimating process (at step 52) for click rate $\mu$ (x,j) with an advertisement attribute shown in FIG. 5. The advertisement attribute database 64 and the click history database 65 are updated with information of all attributes and all advertisements in the click history 146 and the advertisement information 147 (at step 61).

Next, advertisements y (j) with a set of advertisement attributes v (y(j)) that are the most similar to a set of advertisement attributes v (j) of advertisements j in the advertisement information 147 are searched from the advertisement attribute database 64. A set of attributes v(j) can be seen as a binary vector whose component value is 1 if and only if v(j) contains the attribute corresponding to the component. The advertisement attribute database 64 contains a set of advertisement attributes of past advertisements. Similarity Sim (v (j), v (j')) between sets of advertisement attributes v (j) and v (j') is obtained as the cosine of angles between vectors v (j) and v (j') and calculated by the following formula.

$$\mathrm{Sim}(v(j),\,v(j'))=\frac{|v(j)\cdot v(j')|}{\sqrt{|v(j)||v(j')|}} \quad (13a)$$

where "|v (j)|","|v (j')|", and so forth represent the numbers of elements of sets v (j) and v (j'); and "·" represents an inner product calculation, namely, v(j)·(j') represents the number of common attributes to two sets v(j) and v(j') in this case. At last, the click history of the most similar advertisement y (j) obtained at step 62 is searched from the click history database 65 for all advertisements j in the advertisement information 147. With the click history of the most similar advertisement y (j), estimation value $\mu$(x,j) of the click rate is obtained (at step 63).

The click history database 65 contains the number of display times of each attribute of past advertisements and the number of click times thereof With the data contained in the click history database 65, D (x, y (j)) and C (x, y (j)) are obtained. D (x, y (j)) is the number of display times of advertisement y (j) on a page with attribute i (x), whereas C (x, y (j)) is the number of click times thereof.

As shown in FIG. 6, it is determined whether or not D (x, y (j)) is 0 (at step 631). When the determined result at step 631 is Yes (namely, D (x, y (j)) is 0), the average click rate of the click history database 65 is $\mu$(x,j) (at step 632). When the determined result at step 631 is No (namely, D (x, y (j)) is not 0), the click rate of which C (x, y (j)) is divided by D (x, y (j)) is $\mu$ (x,j) (at step 633).

Next, with reference to FIG. 7, a calculating method of function Coef at step 53 in FIG. 5 using Gittins Index or "compensated Gittins Index" which is Gittins Index compensated with Laplace estimation will be described in details.

A method for selecting an advertisement with the maximum value of Gittins Index is an optimum method for maximizing the expected number of click times in the case that successes(click-throughs) far in the future are geometrically discounted. Strictly speaking, the expected number of success times is given by the following formula.

$$\sum_{i=1}^{\infty} g^{i-1}\cdot t_i \quad (13b)$$

where ti is a random variable whose value is 1 if the i-th attempt succeeds and 0 if the i-th attempt failed; and g is a constant (0<g <1) that represents a discounting factor applied for future situations. Even if the observed click rate is the same, the smaller the number of impressions is, the larger the value of Gittins Index is. Thus, the method for maximizing the value of Gittins Index is suitable for acquisition of knowledge because of priority selection of an advertisement with a smaller number of impressions and use of knowledge because of easy selection of an advertisement with a high estimated click rate.

In this example, since such a concept is applied for a calculation of an objective function of a restricted advertisement selecting method according to the linear programming method, both the constraints satisfaction problem and the exploration-exploitation trade-off can be solved.

Now, it is assumed that the number of display times of a particular advertisement is (a+b), that the number of click times is a, and that the number of non-click times is b. In this case, Gittins Index I (a, b) of the advertisement equals the probability p such that if there were another advertisement with known click rate p then displaying either advertisement (and doing everything the optimal way after that) would lead to the same expected total number of click-throughs (in the case that click-throughs far in the future are geometrically discounted). The expected number of success times R (a, b, p) is recursively given by the following formula.

$$R(a,\,b,\,p)= \quad (14)$$
$$\max\left(\frac{p}{1-g},\,\frac{a}{a+b}(1+gR(a+1,\,b,\,p))+\frac{b}{a+b}gR(a,\,b+1,\,p)\right)$$

Gittins Index I (a, b) is p that satisfies the following equation.

$$\frac{p}{1-g}=\frac{a}{a+b}(1+gR(a+1,\,b,\,p))+\frac{b}{a+b}gR(a,\,b+1,\,p) \quad (15)$$

In the real calculation, while p is being varied with a particular accuracy, values are obtained so that the left side of formula (15) becomes the closest to the right side thereof. To prevent R (a, b, p) from being endlessly recurred, when the value of a+b is a particular value Z, R (a, b, p) is calculated by the following formula.

$$R(a,\,b,\,p)=\frac{a}{a+b}\cdot\frac{1}{1-g} \quad (16a)$$

Thus, R (a, b, p) is prevented from being endlessly recurred.

FIG. 7 is a flow chart showing a process of a calculating means using Gittins Index of estimating function Coef at step 53 shown in FIG. 5. The calculating means has an initializing means (at step 531), a variable updating means (at step 532), a critical condition determining means (at step 533), a recursive calculating means (at step 534), an update condition determining means (at step 535), an updating means (at step 536), a critical means (at step 537), an end condition determining means (at step 538), and an output/end means (at step 539).

The initializing means initializes an error parameter D, a probability p, a recursive end parameter Z, a recursive parameter d, and so forth at step 531. The variable updating means updates the parameters p, d, a, and b at step 532. The parameter a represents the number of success times. The parameter b represents the number of fail times. The critical condition determining means calculates a critical condition at step 533. When the determined result of the critical condition determining means 533 is Yes (namely, the value of the parameter d is a predetermined value), the flow advances to step 537. When the determined result at step 533 is No (namely, the value of the parameter d is not the predetermined value), the flow advances to step 534 of the recursive calculating means. At step 537, the values of R (a, b, p) and I (a, b) are not recursively calculated, but with an approximation expression. In the conventional calculation using Gittins Index, R (a, b, p) and I (a, b) are given by the following formulas.

$$R(a, b, p) = \frac{a}{(a+b)(1-g)} \quad (16b)$$

$$I(a, b) = \frac{a}{a+b} \quad (16c)$$

In FIG. 7, calculation expressions are given for calculating compensated Gittins Index using Laplace estimating method.

In other words, in FIG. 7, in the mathematical expressions at step 537, the success rate is given by a/(a+b) and the fail rate is given by b/(a+b). By the Laplace estimating method, the success rate is given by (a+0.5) (a+b+1) and the fail rate is given by (b+0.5)/(a+b+1). The number of expected success times R (a, b, p) is recursively calculated using success and fail rates and the number of expected success times at the next trial. Thus, the compensated Gittins Index is calculated at step 537 and step 543 of the recursive calculating means of the calculating means shown in FIG. 7.

In the conventional Gittins Index, the value of an alternative of which the number of success times is 0 becomes 0. Thus, an alternative that does not succeed in first several attempts will not be selected later. However, by applying a compensation using Laplace estimating method, such a problem can be solved.

As was described in the process of the objective function determining means 222 shown in FIG. 2, R (a, b, p) and I (a, b) can be compensated using an estimated click rate $\mu(x,j)$ of a similar advertisement j. In this case, R (a, b, p) and I (a, b) at step 537 are given by the following formulas.

$$R(a, b, p) = \frac{a + \mu(x, j)}{(a+b+1)(1-g)} \quad (16d)$$

$$I(a, b) = \frac{a + \mu(x, j)}{a+b+1} \quad (16e)$$

After the critical condition determining step 533 or the critical step 537, the flow advances to step 534 of the recursive calculating means 534. The recursive calculating means calculates LHS and RHS with given calculating expressions and sets the value of max (LHS, RHS) to R (a, b, p) at step 534. In this case, it is assured that R (a+1, b, p) and R (a, b+1, p) used in the calculation of RHS have been calculated by changing the updating order of recursive parameters.

The update condition determining means determines whether or not the difference between LHS and RHS calculated by the recursive calculating means (at step 534) is smaller than D (a, b) (at step 535). When the difference is smaller than D (a, b), the updating means updates the values of I (a, b) and D (a, b) (at step 536).

Next, the stop condition determining means determines whether or not d is 0 (at step 538). When the determined result at step 538 is Yes (namely, d is 0), the stop condition determining means outputs the value of I (at step 538). The output/end means stops the process (at step 539). When the determined result at step 538 is No (namely, d is not 0), the flow returns to step 532.

FIG. 8 is a flow chart showing the structure of the advertisement selecting means 151. The advertisement selecting means 151 performs the following process for selecting one advertisement ID corresponding to an input attribute list 84.

The advertisement selecting means 151 selects one attribute i from the attribute list at random (at step 81). Next, with the cluster table 23 stored in the display probability function storing portion 153, the advertisement selecting means 151 obtains a representative attribute i' to which the attribute i belongs (at step 82). Lastly, with the display probability table 24 stored in the display probability function storing portion 153, the advertisement selecting means 151 randomly selects an advertisement ID according to the display probability of each advertisement having the attribute i' (at step 83).

As described above, according to the banner advertisement selecting method of the present invention, the display probability of each advertisement for an input attribute can be quickly calculated with click history data obtained from a small number of display times of each banner advertisement having each attribute so that the total estimated click rate becomes maximum. By selecting an advertisement according to the display probability, it is expected that the total number of click times be increased.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A banner advertisement selecting method for selecting a banner advertisement displayed on a page browsed through the world wide web (WWW) from an attribute list obtained corresponding to information transmitted with a page browsing request, information of the browsed page, and user information, the method comprising the steps of:
    (a) estimating the input probability of each attribute and the click rate of each advertisement for each attribute corresponding to an input attribute distribution of the banner advertisement and a click history of which the banner advertisement was clicked;
    (b) obtaining a display probability of each banner advertisement for each attribute so that the total click rate becomes maximum;
    (c) selecting a banner advertisement according to the display probability; and (d) transforming a constrained objective function maximizing problem obtained at step (b) to the known transportation problem and solving the transportation problem.

2. The banner advertisement selecting method as set forth in claim 1, further comprising the steps of:

(e) clustering attributes with similar click histories, step (e) being followed by step (b);

(f) obtaining a cluster to which the input attribute belongs; and (g) selecting a banner advertisement to be displayed according to the display probability of each banner advertisement for the cluster.

3. The banner advertisement selecting method as set forth in claim 2, wherein step (b) is performed by treating step (e) as a problem for estimating a click rate conditioned with each attribute using a past click rate history for each attribute, and repeatedly combining attributes that causes the total description length to be minimized or sub-minimized using a greedy heuristic based on the theory of minimum description length so as to decrease the number of estimation parameters and improve the estimation accuracy.

4. The banner advertisement selecting method as set forth in claim 2, wherein step (b) is performed by treating step (e) as a problem for estimating a click rate conditioned with each attribute using a past click rate history for each attribute, and repeatedly combining attributes that causes the total information amount to be minimized or sub-minimized using a greedy heuristic based on Akaike information criterion so as to decrease the number of estimation parameters and improve the estimation accuracy.

5. The banner advertisement selecting method as set forth in claim 1, further comprising the step of:

(h) securing a large value as the minimum display probability that is inversely proportional to the square root of the number of display times of each banner advertisement with each attribute.

6. The banner advertisement selecting method as set forth in claim 1, further comprising the steps of:

(i) calculating estimation value c of the click rate for each banner advertisement j with each attribute i using the number of display times and the number of click times; obtaining estimation value $\mu$ of the click rate for attribute i of past banner advertisement j' having attributes similar to the attributes of banner advertisement j;

(j) adding 1 to the number of display times of banner advertisement j with attribute i; and (k) calculating estimation value c of the click rate with a value of which $\mu$ is added to the number of click times.

7. The banner advertisement selecting method as set forth in claim 1, wherein Gittins Index or compensated Gittins Index compensated by Laplace estimation is used instead of the estimation value of the click rate that forms the maximized objective function.

8. The banner advertisement selecting method as set forth in claim 1, further comprising the step of:

(l) randomly selecting one attribute from a plurality of input attributes; and (m) selecting a banner advertisement to be displayed according to the display probability of each banner advertisement with the selected attribute.

9. The banner advertisement selecting method as set forth in claim 2, further comprising the step of:

(h) securing a large value as the minimum display probability that is inversely proportional to the square root of the number of display times of each banner advertisement with each attribute.

10. The banner advertisement selecting method as set forth in claim 2, further comprising the steps of:

(i) calculating estimation value c of the click rate for each banner advertisement j with each attribute i using the number of display times and the number of click times; obtaining estimation value $\mu$ of the click rate for attribute i of past banner advertisement j' having attributes similar to the attribute of banner advertisement j;

adding 1 to the number of display times of banner advertisement j with attribute i; and (k) calculating estimation value c of the click rate with a value of which $\mu$ is added to the number of click times.

11. The banner advertisement selecting method as set forth in claim 2, wherein Gittins Index or compensated Gittins Index compensated by Laplace estimation is used instead of the estimation value of the click rate that forms the maximized objective function.

12. The banner advertisement selecting method as set forth in claim 2, further comprising the step of:

(l) randomly selecting one attribute from a plurality of input attributes; and (m) selecting a banner advertisement to be displayed according to the display probability of each banner advertisement with the selected attribute.

13. A banner advertisement selecting apparatus for selecting a banner advertisement displayed on a page browsed through the world wide web from an attribute list obtained corresponding to information transmitted with a page browsing request, information of the browsed page, and user information, comprising:

estimating means for estimating the input probability of each attribute and the click rate of each advertisement for each attribute corresponding to an input attribute distribution of the banner advertisement and a click history of which the banner advertisement was clicked;

display probability securing means for obtaining a display probability of each banner advertisement for each attribute so that the total click rate becomes maximum;

display probability creating means for transforming a constrained objective function maximizing problem obtained by said display probability securing means to the known transportation problem, solving the known transportation problem and creating the display probability of each banner advertisement; and selector for selecting a banner advertisement according to the display probability.

14. The banner advertisement selecting apparatus as set forth in claim 13, further comprising:

cluster creating means for clustering attributes with similar click histories, obtaining a cluster to which the input attribute belongs, and selecting the banner advertisement to be displayed according to the display probability of each banner advertisement for the cluster.

15. The banner advertisement selecting method as set forth in claim 13, wherein said display probability securing means is performed by treating said display probability creating means as a problem for estimating a click rate conditioned with each attribute using a past click rate history for each attribute, and repeatedly combining attributes that causes the total description length to be minimized or sub-minimized using a greedy heuristic based on the theory of minimum description length so as to decrease the number of estimation parameters and improve the estimation accuracy.

16. The banner advertisement selecting method as set forth in claim 14, wherein said display probability securing means is performed by treating said display probability creating means as a problem for estimating a click rate conditioned with each attribute using a past click rate history for each attribute, and repeatedly combining attributes that causes the total description length to be minimized or sub-minimized using a greedy heuristic based on Akaike information criterion so as to decrease the number of estimation parameters and improve the estimation accuracy.

17. A banner advertisement selecting apparatus for selecting a banner advertisement displayed on a page browsed through the world wide web (WWW) from an attribute list obtained corresponding to information transmitted with a page browsing request, information of the browsed page, and user information, comprising:

banner advertisement displaying means for selecting the banner advertisement and transmitting image data thereof to the web browsing software;

advertisement page displaying means for recording a click history and displaying detailed advertisement pages of the advertisement provider;

learning information providing means for providing to a learning engine with an input attribute distribution, the click history, and advertisement information so that the learning engine learns a display probability function used to select an advertisement;

advertisement managing means for managing advertisement contract information;

wherein the learning engine comprise;

advertisement selecting means for selecting one attribute from an attribute list at random;

a display probability function storing portion for being stored a cluster table clustering an attribute based on input information;

learning means for storing a predictive display probability function referenced by the advertisement selecting means to the display probability function storing portion;

a data storing portion for being referenced and updated by said learning means.

* * * * *